United States Patent
Rivers-Moore et al.

(10) Patent No.: US 9,514,104 B2
(45) Date of Patent: *Dec. 6, 2016

(54) OPENING NETWORK-ENABLED ELECTRONIC DOCUMENTS

(71) Applicant: MICROSOFT TECHNOLOGY LICENSING, LLC, Redmond, WA (US)

(72) Inventors: Jonathan E. Rivers-Moore, Bellevue, WA (US); Danny Van Velzen, Remond, WA (US); Prachi Bora, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/930,102

(22) Filed: Jun. 28, 2013

(65) Prior Publication Data

US 2013/0290831 A1  Oct. 31, 2013

Related U.S. Application Data

(63) Continuation of application No. 12/831,823, filed on Jul. 7, 2010, now Pat. No. 8,479,088, which is a continuation of application No. 11/275,821, filed on Jan. 30, 2006, now Pat. No. 7,779,343.

(51) Int. Cl.
*G06F 17/22* (2006.01)
*G06F 17/30* (2006.01)
*G06F 9/445* (2006.01)

(52) U.S. Cl.
CPC ....... *G06F 17/2247* (2013.01); *G06F 9/44521* (2013.01); *G06F 17/30876* (2013.01); *G06F 17/30899* (2013.01)

(58) Field of Classification Search
CPC ............ G06F 17/2247; G06F 17/30899; G06F 17/30876; G06F 8/33; G06F 9/44521
See application file for complete search history.

(56) References Cited

U.S. PATENT DOCUMENTS

| | | | | |
|---|---|---|---|---|
| 6,098,081 | A * | 8/2000 | Heidorn et al. | 715/200 |
| 6,415,335 | B1 * | 7/2002 | Lowery et al. | 710/5 |
| 6,772,139 | B1 * | 8/2004 | Smith, III | 707/748 |

(Continued)

*Primary Examiner* — Maikhanh Nguyen
(74) *Attorney, Agent, or Firm* — Julie Kane Akhter; Tom Wong; Micky Minhas

(57) ABSTRACT

System(s), method(s), and/or technique(s) ("tools") are described that enable a user to open a network-enabled electronic document in either a specific software application associated with the electronic document or a network browser. In some cases the tools do so using a single link. On selection of the link, if the user's computing device has access to the specific software application, the tools may load the electronic document using that application. Or, if the user's computing device does not have access to the specific software application, the tools may render the electronic document with a network browser. In so doing, the tools may make the document available to a larger set of potential users through their browsers, allow users the convenience of accessing the document within a browser, optimize users' experience in working with the document through a specific software application, or provide a simpler opening procedure.

19 Claims, 5 Drawing Sheets

(56) References Cited

U.S. PATENT DOCUMENTS

| | | | |
|---|---|---|---|
| 6,876,996 B2* | 4/2005 | Czajkowski et al. | |
| 6,920,461 B2* | 7/2005 | Hejlsberg et al. | |
| 6,938,077 B2* | 8/2005 | Sanders | 709/219 |
| 6,948,134 B2* | 9/2005 | Gauthier | G06F 17/246 707/999.01 |
| 7,003,719 B1* | 2/2006 | Rosenoff et al. | 715/205 |
| 7,039,875 B2* | 5/2006 | Khalfay et al. | 715/762 |
| 7,062,764 B2* | 6/2006 | Cohen et al. | 717/171 |
| 7,099,899 B2* | 8/2006 | Choy et al. | |
| 7,114,128 B2* | 9/2006 | Koppolu et al. | 715/781 |
| 7,177,938 B2* | 2/2007 | Sanders | 709/228 |
| 7,188,160 B2* | 3/2007 | Champagne et al. | 709/220 |
| 7,203,937 B1* | 4/2007 | Kyle et al. | 717/168 |
| 7,539,944 B2* | 5/2009 | Gauthier | G06F 17/246 715/739 |
| 7,743,082 B2* | 6/2010 | Arcuri et al. | 707/822 |
| 7,840,888 B2* | 11/2010 | Lin | 715/208 |
| 2002/0036662 A1* | 3/2002 | Gauthier | G06F 17/246 715/835 |
| 2002/0087559 A1* | 7/2002 | Pratt | 707/100 |
| 2002/0103824 A1* | 8/2002 | Koppolu et al. | 707/501.1 |
| 2003/0088716 A1* | 5/2003 | Sanders | 709/330 |
| 2003/0140132 A1* | 7/2003 | Champagne et al. | 709/223 |
| 2003/0167277 A1* | 9/2003 | Hejlsberg et al. | 707/102 |
| 2005/0177573 A1* | 8/2005 | Gauthier | G06F 17/246 |
| 2005/0267917 A1* | 12/2005 | Arcuri et al. | 707/200 |
| 2006/0031532 A1* | 2/2006 | Sanders | 709/227 |

* cited by examiner

OPENING NETWORK-ENABLED ELECTRONIC DOCUMENTS

CROSS-REFERENCE TO RELATED APPLICATIONS

This application is a continuation of U.S. Pat. No. 8,479,088, filed on Jul. 7, 2010, which is a continuation of U.S. Pat. No. 7,779,343 filed on Jan. 30, 2006, and entitled "OPENING NETWORK-ENABLED ELECTRONIC DOCUMENTS." Both applications referenced above are hereby incorporated by reference.

BACKGROUND

Currently, users may open network-enabled electronic documents by selecting links. Some links cause a specific software application associated with the electronic document to load the electronic document. Some other links cause a network browser to render the electronic document.

Assume, for example, that a sales manager wants to enable his or her salesmen to be able to open an electronic document to record their sales. The sales manager may send an email to the salesmen with two links to the electronic document: one for opening the electronic document using a specific software application associated with the electronic document; and one for opening the electronic document with a network browser.

SUMMARY

System(s), method(s), and/or technique(s) ("tools") are described that enable a user to open a network-enabled electronic document in either a specific software application associated with the electronic document or a network browser. In some cases the tools do so using a single link. On selection of the link, if the user's computing device has access to the specific software application, the tools may load the electronic document using that application. Or, if the user's computing device does not have access to the specific software application, the tools may render the electronic document with a network browser. In so doing, the tools may make the document available to a larger set of potential users through their browsers, allow users the convenience of accessing the document within a browser, optimize users' experience in working with the document through a specific software application, or provide a simpler opening procedure.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE SEVERAL VIEWS OF THE DRAWINGS

The same numbers are used throughout the disclosure and figures to reference like components and features.

DETAILED DESCRIPTION

Overview

The following document describes tools capable of enabling a user to open a network-enabled electronic document in either a specific software application associated with the electronic document or a network browser. The tools may decide between these options based on: whether the user's computing device has access to the specific software application or a version of that application capable of fully implementing the electronic document's functions; a preselected setting or default; or the user's selection, among others.

An environment in which the tools may enable these and other actions is set forth below in a section entitled Exemplary Operating Environment. This section is followed by another section describing exemplary ways in which the tools open a network-enabled electronic document responsive to the electronic document being selected with a link in a document library, entitled Selecting an Electronic Document with a Link in a Document Library. Another section follows and describes exemplary ways in which the tools open a network-enabled electronic document responsive to the electronic document being selected with other types of links, entitled Selecting an Electronic Document with a Link in a Webpage, Email, or Document. A final section, entitled Determining Where to Open Electronic Documents, sets forth an exemplary process by which the tools may determine whether to open an electronic document in a network browser or a specific software application. These section titles are provided for the reader's convenience and do not alter or limit the scope of the entitled sections.

Exemplary Operating Environment

Before describing the tools in detail, the following discussion of an exemplary operating environment is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
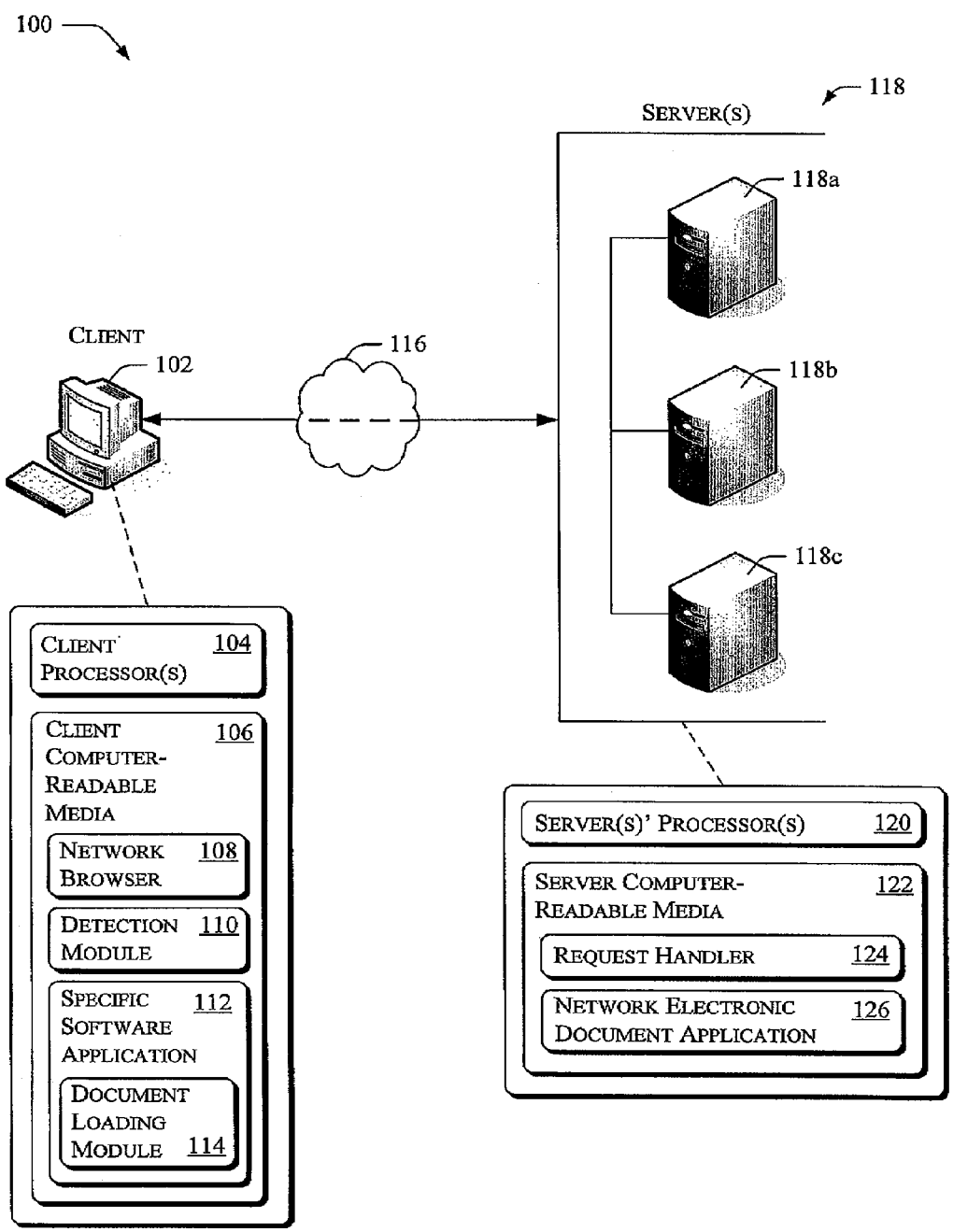
FIG. 1 illustrates an exemplary operating environment in which various embodiments of the tools may operate.

FIG. 1 illustrates one such operating environment generally at 100 comprising a client computing device 102 having one or more client processor(s) 104 and client computer-readable media 106. The client computing device is shown with a desktop computer icon but may be another type of computing device, such as a smart phone, laptop, or personal digital assistant. The client processors are capable of accessing and/or executing the computer-readable media. The client computer-readable media comprises or has access to a network browser 108, which is a module, program, or other entity capable of interacting with a network-enabled entity, a detection module 110, and a specific software application 112.

The detection module is capable of detecting whether or not the client computing device has access to the specific software application and, in some cases, the specific software application's version and capabilities. It may be part of or separate from the network browser and comprise script and/or an ActiveX module. The specific software application is capable of opening a specific type of electronic document, such as an Excel™ application that is capable of editing Excel™-type spreadsheet electronic documents or an Infopath™ application that is capable of editing Infopath™-form types of electronic documents. The specific software application may also comprise or be affected by a document loading module 114, which is capable of causing an electronic document to be loaded and opened within the specific software application.

The operating environment also comprises a network 116 and server(s) 118 ("servers"). The network enables communication between the client and the servers, and may comprise a global or local wired or wireless network, such as the Internet or a company's intranet.

The servers comprise a single server or multiple servers, such as a server farm, though the servers may also comprise additional server or non-server entities capable of communicating with other entities or of governing the individual servers. The servers are shown with three separate servers 118a, 118b, and 118c operating serially or in parallel to service requests.

The servers comprise servers' processors 120 and server computer-readable media 122. The server processors are capable of accessing and/or executing the server computer-readable media. The server computer-readable media comprises or has access to a request handler 124, and a network electronic document application 126. The request handler is capable of receiving or intercepting requests, such as requests generated responsive to a user selecting to open an electronic document. The network electronic document application is capable of servicing an electronic document, such as by creating and providing HTML ("HyperText Markup Language") enabling the network browser to render the electronic document and receiving and saving edits to the electronic document.

Selecting an Electronic Document with a Link in a Document Library

The following discussion describes exemplary ways in which the tools open a network-enabled electronic document in either a specific software application associated with the electronic document or a network browser responsive to the electronic document being selected with a link in a document library. A document library may comprise, for example, a web page containing a collection of electronic documents and a way in which to select a link to each of these documents. This discussion refers to particular elements, such as elements of operating environment 100 of FIG. 1, though other elements and environments may be used.

When a user selects a link, such as a hyperlink in a document library to open an electronic document, the tools determine whether or not a specific software application associated with the electronic document is available on or accessible by the user's computing device (e.g., it is installed). The tools also determine whether or not the specific software application is of a version compatible with the electronic document. If both of these are true, the tools may load the electronic document on the user's computing device with the specific software application. In some cases there is an indication (e.g., a previously selected setting) indicating that the electronic document should only be opened in the network browser. In these cases the tools may forgo these actions and immediately open the electronic document in the network browser.

If the specific software application associated with the electronic document is not accessible or is accessible but of an incompatible version, the tools may also open the electronic document with the user's network browser. To do so, the tools may, in some cases, cause the network browser to navigate to a page with appropriate query parameters sufficient to cause the browser to open the electronic document on that page.

The tools may behave in either of these manners regardless of whether the user is selecting to create a new electronic document or is selecting an existing electronic document. Also, when the user is done with the electronic document, the tools may return the user to the page that was used to open the document (e.g., the document library page or other page through which the link was selected). An exemplary process performing some of the above actions is set forth immediately below.

Figure 2:
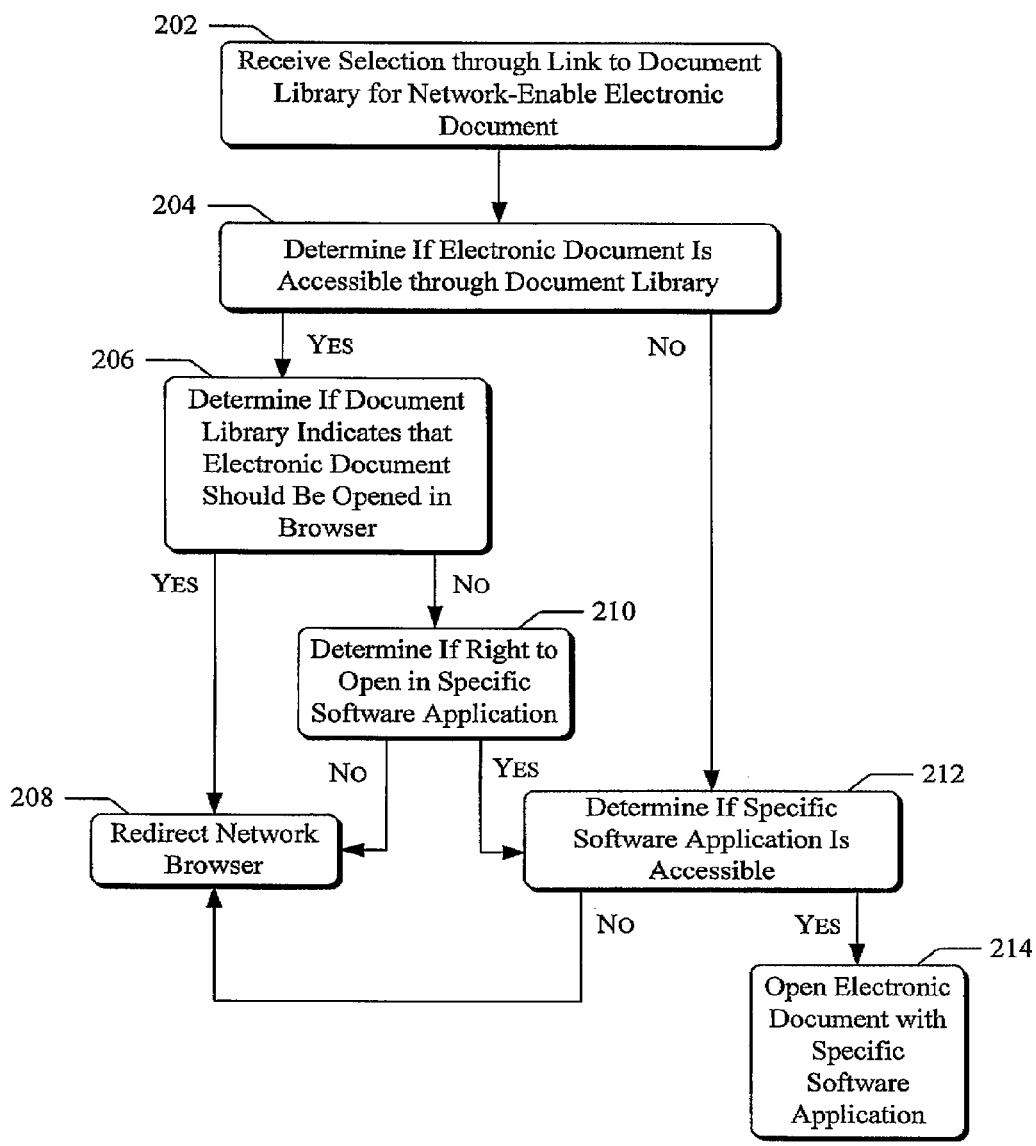
FIG. 2 is an exemplary process illustrating some ways in which the tools open a network-enabled electronic document in either a specific software application associated with the electronic document or a network browser when the electronic document is selected with a link in a document library.

FIG. 2 is an exemplary process 200 illustrating some ways in which the tools open a network-enabled electronic document selected with a link in a document library. The process is illustrated as a series of blocks representing individual operations or acts performed by elements of operating environment 100 of FIG. 1, such as detection module 110 and request handler 124. This and other processes disclosed herein may be implemented in any suitable hardware, software, firmware, or combination thereof; in the case of software and firmware, these processes represent a set of operations implemented as computer-executable instructions stored in computer-readable media and executable by one or more processors.

Block 202 receives a selection through a link to a document library for a network-enabled electronic document. A user, for instance, may click on an icon (e.g., a button graphic) associated with, or text for, a universal resource locator (URL) to select the electronic document in the document library.

Block 204 determines whether the electronic document is accessible through the document library, such as by being on a shared enterprise server (e.g., a SharePoint™ server). If yes, the tools proceed to block 206. If no, the tools proceed to block 212.

Block 206 determines whether the document library has a previously selected or default setting indicating that the electronic document should be opened in the network browser regardless of whether or not the specific software application associated with the electronic document is accessible and of a compatible version. If yes (it does have a setting), the tools proceed to block 208. If no, the tools proceed to block 210.

Block 208 redirects the network browser to a page on which the electronic document may be opened. Here the tools redirect the network browser to a dynamic server-generated browser page that is capable of opening the electronic document. This dynamic server-generated browser page may be generated using asp, aspx, jsp, php, and cgi technologies, for example, which permit the document to be displayed as part of the dynamic server-generated browser page. Here the tools use a URL having the URL for the electronic document along with query parameters. These query parameters indicate whether the document library is set for the electronic document to be opened in the browser even if the specific software application is accessible. These query parameters may contain an encoded server-relative path to the electronic document's file and an encoded absolute path to the page that was used to open the file. The absolute path parameter may later be used by the network browser to navigate back to that page when the electronic document is closed.

Block 210 determines whether the user has a right to open the electronic document in the specific software application. The tools may determine this based on a security setting in the file for the electronic document, which may be referenced in the path of the request. If no, the tools proceed to block 208 and redirect the network browser. If yes, the tools proceed to block 212.

Block 212 determines if the specific software application associated with the network-enable electronic document is accessible and, in some cases, whether it is of a compatible version. Here block 212 determines whether or not a document loading module associated with the specific software application is installed (e.g., an ActiveX module) on the user's computing device. If yes, the tools proceed to block 214. If no, the tools proceed to block 208.

Block 214 opens the electronic document with the specific software application. Here the tools use the document loading module to open the electronic document in the specific software application. The document loading module may receive, as a parameter, the URL for the electronic document. With this parameter, the specific software application requests the file for the electronic document in such a way that the server can distinguish the request from a network browsers request. In one particular embodiment, the server distinguishes the request with a translate F HTTP header, receives the file, and opens the electronic document.

Selecting an Electronic Document with a Link in a Webpage, Email, or Document

The following discussion describes exemplary ways in which the tools open a network-enabled electronic document in either a specific software application associated with the electronic document or a network browser responsive to the electronic document being selected with a link in a webpage, email, or document. This discussion refers to particular elements, such as elements of operating environment 100 of FIG. 1, though other elements and environments may be used.

When a user selects a link to open an electronic document through a webpage, email, document (e.g., a word-processing document), or the like, the tools determine whether or not a specific software application associated with the electronic document is accessible by the user's computing device (e.g., it is installed) and is of a version compatible with the electronic document.

If these are both true, the tools cause the specific software application to open the electronic document. If these are not both true, the tools cause the network browser to open the electronic document. To open the electronic document using the network browser, the tools cause the network browser to navigate to a page with appropriate query parameters sufficient to cause the browser to open the electronic document on that page.

The tools may behave in either of these manners regardless of whether the user is selecting a new or existing electronic document. When the user is done with the electronic document, the tools may return the user to the document library page or other page through which the user selected the link. An exemplary process performing some of the above actions is set forth immediately below.

Figure 3:
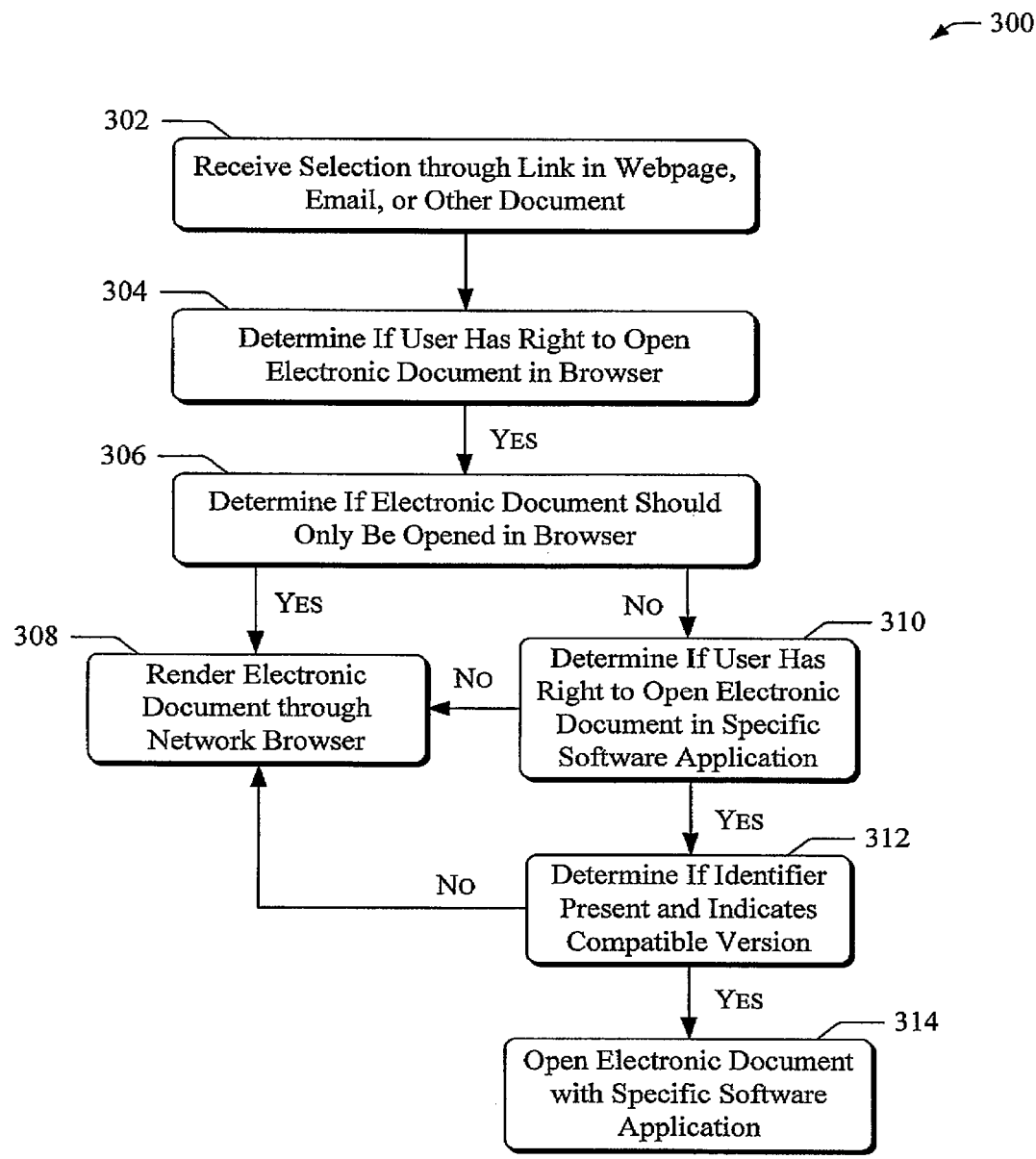
FIG. 3 is an exemplary process illustrating some ways in which the tools open an electronic document responsive to a user selecting the electronic document with a link in a webpage, an email, or another document.

FIG. 3 is an exemplary process 300 illustrating some ways in which the tools open an electronic document responsive to a user selecting the electronic document with a link in a webpage, an email, or another document. The process is illustrated as a series of blocks representing individual operations or acts performed by elements of operating environment 100 of FIG. 1, such as detection module 110 and request handler 124.

Block 302 receives a selection through a link in a webpage, email, or other document and for a network-enabled electronic document. A user, for instance, may click on a universal resource locator (URL) link in an email to select the electronic document.

Block 304 determines whether or not the user has a right to open the electronic document at least in the network browser. The tools may do so through information in the file for the electronic document, such as security settings and the identity of the user or machine through which the user selected the link. If block 304 determines that the user does not have this right, the tools may end the process and/or provide an error message (not shown).

Block 306 determines whether or not the electronic document should only be opened in the network browser. The tools may determine that the electronic document should be loaded in the network browser even if the user's computing device has access to the specific software application based on a default setting or a previously selected setting. If yes (it should be opened in the network browser), the tools proceed to block 308. If no, the tools proceed to block 310.

Block 308 renders the electronic document through the network browser. The tools may do so using a server having software tailored to the electronic document, such as an electronic-form-ready server for an electronic-form type of electronic document or a spreadsheet-ready server for an electronic document comprising spreadsheets.

Block 310 determines whether the user has a right to open the electronic document in the specific software application. The tools may determine this based on a security setting in the file for the electronic document, which may be referenced in the path of the request. If yes, the tools proceed to block 312. If no, the tools proceed to block 308 and render the electronic document.

Block 312 determines whether an identifier for the specific software application is present and, if so, whether it indicates a version equal to or greater than the electronic document's version. The tools may do so based on query parameters in the header. These query parameters may include those noted as part of process 200 above. If no, the tools proceed to block 308 and render the electronic document. If yes, the tools proceed to block 314.

Block 314 opens the electronic document with the specific software application. The tools may receive, as a parameter, the URL for the electronic document. The tools may then return the electronic document's content such that it will be opened by the specific software application. Or it may then compute a URL for a redirect to the specific software application or append query parameters to the URL for the selected link. These parameters may include those noted as part of process 200. This URL or appended URL is used by the tools to launch the specific software application either with a 302 redirect to the appended URL or by passing the URL to the document loading module.

Determining Where to Open Electronic Documents

The following discussion describes these and alternative ways in which the tools determine where to open a network-enabled electronic document. By way of example, this discussion refers to particular elements, such as elements of operating environment 100 of FIG. 1, processes 200 and 300, and flow diagram 500 of FIG. 5.

Figure 4:
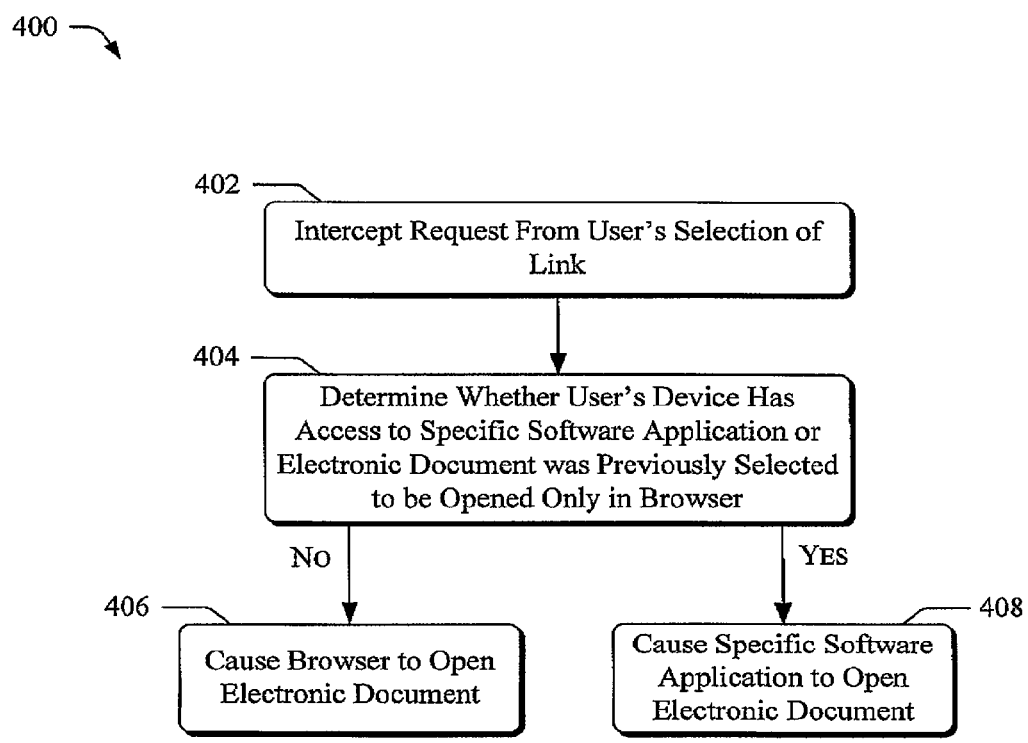
FIG. 4 is an exemplary process describing ways in which the tools determine whether to open in a network browser or a specific software application.

FIG. 4 is an exemplary process 400 illustrated as a series of blocks representing individual operations or acts performed by elements of operating environment 100 of FIG. 1, such as detection module 110 and request handler 124.

Block 402 intercepts a request generated by a user selecting a link to open an electronic document. The link may be to open an electronic document in a document library as set forth in process 200 or a link in a webpage, email, or other document as set forth in process 300. In some cases selection of this link, if it were not intercepted, would cause the specific software application to open the electronic document. In some others, if it were not intercepted, this selection would cause the network browser to open the electronic document.

This link may include information indicating what version or capabilities are needed in a specific software application associated with the requested electronic document to enable the functionality of the electronic document. Alternatively or conjunctively, the detection module may inspect the contents of the electronic document to determine the document's version or capabilities.

Figure 5:
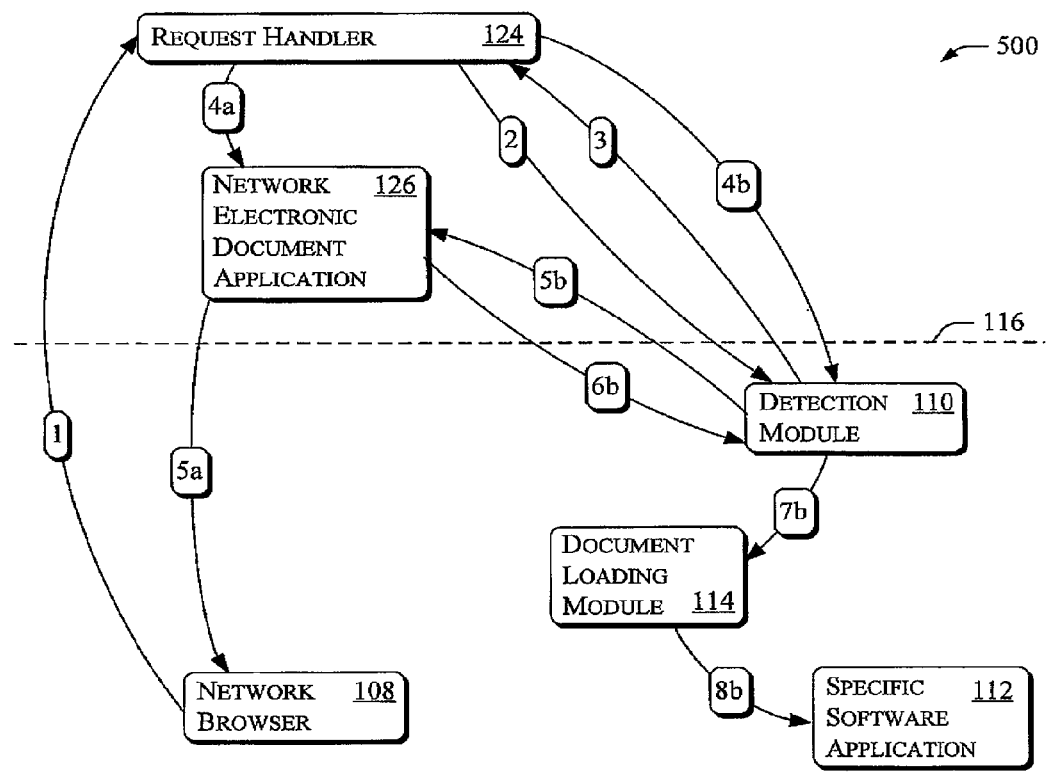
FIG. 5 shows an exemplary flow diagram with actions and/or communications between elements of FIG. 1.

FIG. 5 is an exemplary flow diagram showing actions and/or communications between elements of FIG. 1. Here the request generated by selection of the link is intercepted from network browser 108 (on client computing device 102) by request handler 124 over communications network 116. Communications over the communications network are shown with arrows over a dashed line. This interception is marked with arrow 1.

Block 404 determines whether or not the user's computing device has access to a specific software application associated with the requested electronic document or whether the electronic document was previously selected to be opened only in a network browser. Block 404 may also determine the capabilities of the specific software application and/or its version.

Here the request handler asks detection module 110 whether the user's computing device has access to the specific software application and for its version. The detection module receives this query for information from the request handler, shown at arrow 2. The detection module determines whether the user's client computing device has access to the specific software application (e.g., it is installed) and, if it does, the application's version. The detection module then provides this information, shown at arrow 3, which is received by the request handler. This communication between the request handler and the detection module may be indirect, such as through the network browser.

Block 404 may decide whether or not to make this determination based on the request having information indicating that the requested electronic document may possibly be opened using remote resources (e.g., network electronic document application 126) or local resources (e.g., specific software application 112). In some cases this information is a particular extension in a URL for the request, such as an ".xls" extension for a spreadsheet type of electronic document or an ".xml" extension for an electronic-form type of electronic document. In some other cases, this information is or is derived from meta-information promoted from the document to a filing system or document library.

Block 404 may also determine that the electronic document was previously selected to be opened only in the network browser based on having information indicating that the requested electronic document's URL comprises a particular parameter. This permits designers or other users of an electronic document to ensure that the electronic document is only opened in the network browser even if the user's client computing device has access to the specific software application associated with that electronic document.

Process 400 proceeds to block 406 if the user's client computing device does not have access (and/or an appropriate version or capabilities) to the specific software application or is previously set to be opened by the network browsers. Alternatively, an additional selection may be requested from the user, such as a dialog box asking whether or not the user wishes to open the electronic document in either the network browser or the specific software application (not shown). A user's selection to open the electronic document in the network browser may be determinative. Otherwise, the process proceeds to block 408.

Block 406 causes the electronic document to be opened in a network browser. If the request would have caused the electronic document to be opened in the specific software application—if it were not intercepted—the request handler alters the request effective to enable the network browser to handle the request. This dynamic alteration to the request causes data to be sent to the user's client computing device using a different format than were it not altered. Here the request handler alters the request and submits it to the network electronic document application effective to cause the network electronic document application to send data in a format acceptable for direct rendering in the network browser (e.g., HTML), rather than in the format used by the specific software application (e.g., the format corresponding to the physical file for the electronic document). This is shown in FIG. 5 at arrows 4*a* and 5*a*.

Block 408 causes a specific software application associated with the selected electronic document to open the electronic document. The request handler may instruct the detection module or document loading module 114 to request a physical file (e.g., a non-rendering file) for the electronic document in a format usable by the specific software application. This is shown at arrow 4*b*. The request handler may do so by dynamically altering the request from the user's selection and sending this altered request to the detection module or document loading module and telling it to make a request using this altered request. The request handler alters the user's request by appending query parameters to it (such as those noted in process 200 or 300 above).

Here the detection module receives these instructions and makes a request for a physical file. The detection module makes the request of the network electronic document application, though it may make the request of any source (local or remote) capable of supplying the physical file (arrow 5*b*). This physical file is effective to enable the specific software application to open the electronic document on the user's client computing device. In response, the network electronic document application provides the physical file to the detection module at arrow 6*b*.

The detection module receives the physical file and causes the document loading module to load the physical file and the specific software application effective to cause the specific software application to open the electronic document. This is shown at arrows 7*b* and 8*b*. The document loading module may know to cause the specific software application to load the physical file based on information provided in the physical file, such as its format being compatible with the specific software application but not with the network browser.

In cases where the link is selected by the user through the network browser, such as in a webpage, the tools may remain or return to that webpage. For instance, if a user selects a link in a webpage opened in the network browser, the tools may open the electronic document with the specific software application or within the webpage.

Each of the above acts, includes blocks of process 200, 300, and 400, may all be performed without user interaction other than the user's selection of a link to open an electronic document. This enables a user, with as little as one selection of one link, to open an electronic document in either a network browser or a specific software application, as appropriate. A user may not need, for example, to know whether his or her client computing device has access to the specific software application, that the specific software application is of an appropriate version or capabilities, or that the electronic document should be opened in the network browser even if the user's device has an appropriate specific software application installed.

CONCLUSION

The above-described systems, methods, and/or techniques enable a user to open a network-enabled electronic document in either a specific software application associated with the electronic document or a network browser. In some cases the user may do so through selection of a single link. Although the systems and methods have been described in language specific to structural features and/or methodological acts, it is to be understood that the systems and methods defined in the appended claims are not necessarily limited to the specific features or acts described. Rather, the specific features and acts are disclosed as exemplary forms of implementing the claimed systems and methods.

The invention claimed is:

1. A method implemented by one or more servers to provide access to an electronic document, the method comprising:
    intercepting, at a request handler associated with a server, a request received over a wide-area network from a client computing device to open an electronic document available in a document library accessible by the server, wherein the request, if not intercepted, would cause the specific software application to open the electronic document, wherein the request is generated when the user selects a link from a webpage, and responsive to the electronic document being closed, presenting the webpage;
    determining, without user interaction, that the electronic document should be provided through a dynamic server-generated web page instead of being accessed by the specific software application;
    dynamically altering, without user interaction, at the request handler, the request to include a location of a dynamic server-generated browser page capable of accessing the electronic document; and
    transmitting data to the client computing device over the wide area network for rendering the electronic document in the web browser on the client computing device.

2. The method of claim 1, further comprising receiving, in response to a query, an indication from the client computing device that the specific software application capable of accessing the electronic document is not installed on the client computing device.

3. The method of claim 1, further comprising receiving an indication that the specific software application capable of accessing the electronic device is installed on the client computing device but the electronic document should be accessed by the server instead of the specific software application.

4. The method of claim 3, further comprising requesting access to the electronic document in the dynamic server-generated browser page.

5. The method of claim 1, further comprising:
    requesting information from the client computing device about whether the client computing device has access to the specific software application capable of accessing the document directly on the client computing device.

6. The method of claim 1, wherein the request comprises a Universal Resource Locator (URL) for the electronic document within the document library.

7. The method of claim 1, wherein the request was initiated by a user selection of an embedded icon in a document.

8. The method of claim 1, further comprising receiving the specific software application's version and the electronic document's version, and determining that the client computing device does not have access to the specific software application if the specific software application's version is not compatible with the electronic document's version.

9. The method of claim 1, further comprising determining whether the electronic document was previously selected to be opened only in the web browser and, if the electronic document was so previously selected, causing the web browser to open the electronic document.

10. The method of claim 1, further comprising determining that a file extension associated with the electronic document is for a type of document capable of being opened in only one of the web browser or the specific software application.

11. The method of claim 1, further configured to receive the specific software application's version and the electronic document's version, and determining that the client computing device does not have access to the specific software application if the specific software application's version is not compatible with the electronic document's version.

12. A computing system comprising:
    a processor;
    an electronic document data store; and
    computer storage memory having computer-executable instructions stored thereon which, when executed by the processor, implement a method to access an electronic document from the electronic document data store, comprising:
    receiving an indication that the electronic document is attempting to be accessed by a client computing device;
    determining that the client computing device does not have access to the specific software application capable of accessing the electronic document;
    identifying a network resource capable of accessing the electronic document;
    dynamically altering a network request by appending one or more parameters to the network request for accessing the electronic document, wherein the one or more parameters comprise an encoded server-relative path to a file associated with the electronic document, wherein the appending is performed without user interaction other than a user selection to access the electronic document, wherein the one or more parameters comprise an encoded absolute path to the network resource capable of accessing the electronic document, wherein the encoded absolute path is used by the web browser to navigate back to a specific web page when the electronic document is closed; and transmitting data over a wide area network to the client computing device for rendering the electronic document in a portion of a dynamic server-generated browser page.

13. The system of claim 12, wherein the method further comprises querying for additional information regarding whether the client computing device has access to a specific version of the software application associated with the electronic document.

14. A computing system comprising:
a processor;
an electronic document data store; and
computer storage memory having computer-executable instructions stored thereon which, when executed by the processor, configure the computing system to:
intercept, at a request handler associated with a server, a request received over a wide-area network from a client computing device to open an electronic document available in a document library accessible by the server, wherein the request, if not intercepted, would cause the specific software application to open the electronic document, wherein the request is generated when the user selects a link from a webpage, and responsive to the electronic document being closed, presenting the webpage;
determine, without user interaction, that the electronic document should be provided through a dynamic server-generated web page instead of being accessed by the specific software application;
dynamically alter, without user interaction, at the request handler, the request to include a location of a dynamic server-generated browser page capable of accessing the electronic document; and
transmit data to the client computing device over the wide area network for rendering the electronic document in the web browser on the client computing device.

15. The system of claim 14, further configured to receive, in response to a query, an indication from the client computing device that the specific software application capable of accessing the electronic document is not installed on the client computing device.

16. The system of claim 14, further configured to receive an indication that the specific software application capable of accessing the electronic device is installed on the client computing device but the electronic document should be accessed by the server instead of the specific software application.

17. The system of claim 16, further configured to receive request access to the electronic document in the dynamic server-generated browser page.

18. The system of claim 14, further configured to:
request information from the client computing device about whether the client computing device has access to the specific software application capable of accessing the document directly on the client computing device.

19. The system of claim 14, wherein the request was initiated by a user selection of an embedded icon in a document.

* * * * *